United States Patent
Crawley, II et al.

(10) Patent No.: US 8,359,842 B2
(45) Date of Patent: Jan. 29, 2013

(54) AIRLESS FUEL DELIVERY SYSTEM

(75) Inventors: Wilbur H. Crawley, II, Nashville, IN (US); Samuel N. Crane, Jr., Columbus, IN (US); Zhiwei Yang, Columbus, IN (US); Navin Khadiya, Columbus, IN (US)

(73) Assignee: Emcon Technologies LLC, Wilmington, DE (US)

( * ) Notice: Subject to any disclaimer, the term of this patent is extended or adjusted under 35 U.S.C. 154(b) by 408 days.

(21) Appl. No.: 12/691,024

(22) Filed: Jan. 21, 2010

(65) Prior Publication Data

US 2011/0174264 A1   Jul. 21, 2011

(51) Int. Cl.
*F01N 3/025* (2006.01)

(52) U.S. Cl. ............................ 60/295; 60/297; 60/303

(58) Field of Classification Search .............. 60/295, 60/297, 303
See application file for complete search history.

(56) References Cited

U.S. PATENT DOCUMENTS

| | | | |
|---|---|---|---|
| 4,335,574 A | | 6/1982 | Sato et al. |
| 7,320,443 B2 | | 1/2008 | Nalini |
| 8,056,324 B2 * | 11/2011 | Wiley et al. ................. | 60/290 |
| 2005/0150215 A1 | 7/2005 | Taylor | |
| 2005/0150221 A1 * | 7/2005 | Crawley et al. ............... | 60/295 |
| 2005/0252202 A1 | 11/2005 | Page et al. | |
| 2009/0044523 A1 * | 2/2009 | Wagner et al. ................ | 60/303 |
| 2010/0146948 A1 * | 6/2010 | DaCosta et al. ............... | 60/295 |
| 2010/0313553 A1 * | 12/2010 | Cavanagh et al. ............. | 60/310 |

OTHER PUBLICATIONS

International Search Report and Written Opinion, mailed Sep. 29, 2011.

* cited by examiner

*Primary Examiner* — Erick Solis
(74) *Attorney, Agent, or Firm* — Carlson Gaskey & Olds

(57) ABSTRACT

An airless nozzle and fuel deliver system for a fuel-fired burner sprays fuel droplets for ignition to increase heat for regenerating an exhaust component. A source of pressurized fuel delivers pressurized fuel to a first fuel injector. In response to a first control signal, the first fuel injector is opened and fuel pressure is increased to a desired level to open a valve such that the fuel can be delivered to the airless nozzle. The airless nozzle sprays fuel droplets for a period of time that the first fuel injector is open. In response to a second control signal, the first fuel injector is closed and a second fuel injector is opened such that fuel is vented to decrease fuel pressure between the valve and the first fuel injector to stop the spray of fuel droplets by closing the valve.

14 Claims, 1 Drawing Sheet

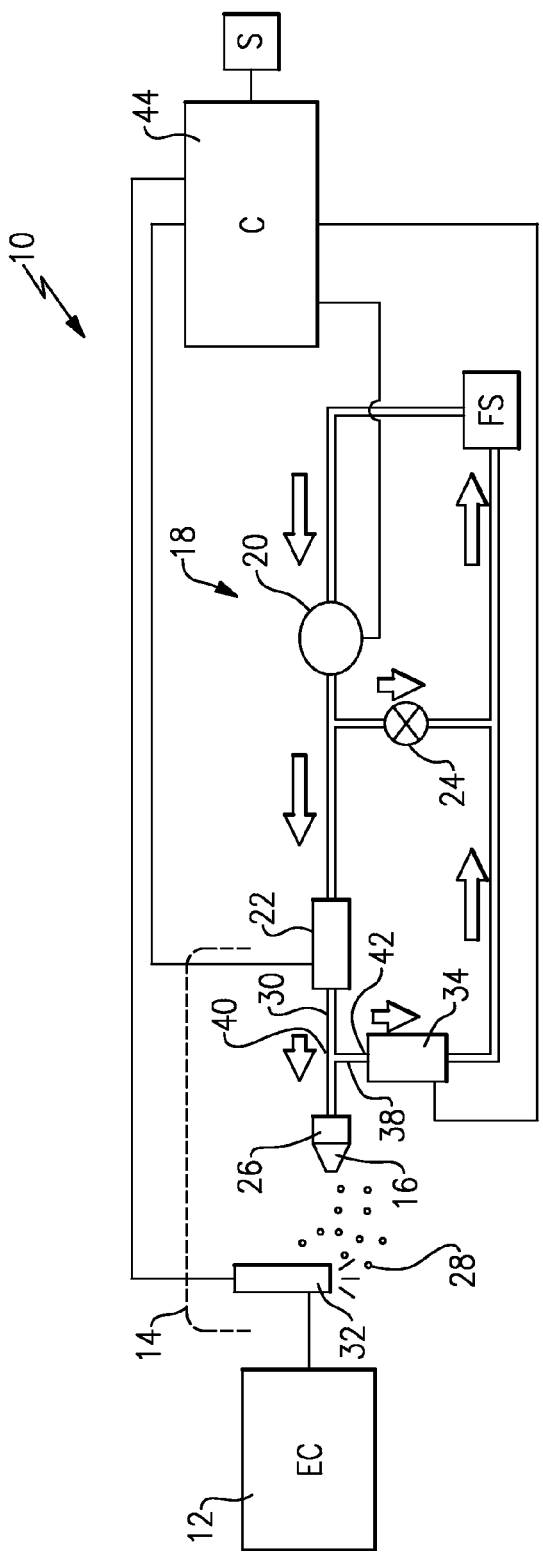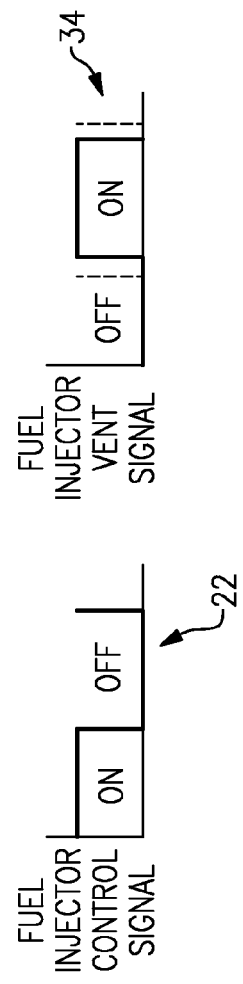

AIRLESS FUEL DELIVERY SYSTEM

TECHNICAL FIELD

The subject invention relates to a fuel delivery system for a burner used for regenerating diesel particulate filters, and more specifically to a fuel delivery system that does not include an air assist.

BACKGROUND OF THE INVENTION

Diesel particulate filters can become clogged over time, which decreases engine operating efficiency. These particulate filters can be regenerated to burn off the trapped particulate matter. A fuel-fired burner is used to generate/increase heat such that the particulate matter can be burned off. Typically, the fuel delivery system of a burner has an air flow and a fuel flow which communicate with each other and inject through a nozzle to provide small sized fuel droplets. This process is called air-assisted atomization. The small fuel droplets form a well-mixed fuel/air mixture with air in the burner. An igniter ignites the fuel/air mixture to increase heat for regeneration.

Smaller diesel fuel droplets enable better ignitability and flammability as well as providing a lower hydrocarbon emission due to more efficient combustion. However, many commercial vehicles with diesel engines do not have onboard high pressure air needed for fuel atomization, which limits the application of these burners. Further, an addition of a high pressure air system increases the overall cost of the burner and the associated vehicle.

SUMMARY OF THE INVENTION

The invention comprises an airless nozzle and fueling system for a fuel-fired burner that sprays fuel droplets for combustion to increase heat for regenerating an exhaust component.

In one example, a fuel delivery system includes a source of pressurized fuel, a first fuel injector in fluid communication with the source of pressurized fuel, a valve downstream of the first fuel injector, and an airless nozzle configured to spray fuel droplets when the valve is open. A second fuel injector is downstream of the first fuel injector. A controller generates a first control signal to open the first fuel injector to supply fuel to the nozzle via the valve to spray fuel droplets. The controller subsequently generates a second control signal to close the first fuel injector with the second fuel injector opening to shut off the spray of fuel droplets.

In one example, the valve is a check valve.

In one example, a pressure regulator regulates a pressure of fuel supplied to the first fuel injector.

In one example, the controller generates pulse width modulation signals to open and close the first and second fuel injectors such that when the first fuel injector is open, the second fuel injector is always closed, and when the first fuel injector is closed, the second fuel injector is always open.

These and other features of the present invention can be best understood from the following specification and drawings, the following of which is a brief description.

BRIEF DESCRIPTION OF THE DRAWINGS

FIG. 1 is a schematic view of an airless nozzle and fuel delivery system for a fuel-fired burner that regenerates an exhaust component.

FIG. 2 is a schematic of pulse width modulations signals generated by a controller to control fuel droplet spray.

DETAILED DESCRIPTION OF THE PREFERRED EMBODIMENT

A vehicle exhaust system 10 includes at least one exhaust component 12 that traps particulate matter, such as a diesel particulate filter for example. A fuel-fired burner 14 generates heat such that trapped particulate matter can be burned off in a regeneration cycle for the exhaust component 12. It should be understood that while the example is directed to a diesel particulate filter, the fuel fired burner can be used with any vehicle exhaust component for regeneration purposes.

The fuel-fired burner 14 includes an airless nozzle 16 and a fueling system 18 that includes a source of pressurized fuel, such as a fuel pump 20 for example, a first fuel injector 22 in fluid communication with the fuel pump 20, and a pressure regulator 24 that regulates a pressure of fuel supplied to the first fuel injector 22. A check valve 26, or other similar flow control valve, is downstream of the first fuel injector 22.

The fuel pump 20 is activated to supply fuel and the fuel pressure is regulated by the fuel pressure regulator 24. While a fuel pump 20 is shown, it should be understood that other sources for supply pressurized fuel could also be used. Fuel at the correct pressure is supplied to the first fuel injector 22, and when the first fuel injector 22 is opened, fuel is directed toward the check valve 26. The airless nozzle 16 is configured to spray fuel droplets 28 when the check valve 26 is open.

It should be understood that the subject airless system could also be used with other types of exhaust components 12 where fine accurate sprays are required. Examples include: Hydrocarbon Dosing of a Diesel oxidation catalyst and dosing of urea in a SCR system for NOx reduction.

A first fuel line 30 is between the first fuel injector 22 and the airless nozzle 16. Fuel flows through the first fuel line 30 and is directed into the airless nozzle 16 without any additional external air being introduced into the first fuel line 30. This is contrary to traditional air-assisted atomization which incorporates an air inlet line into the fuel line 30. An igniter 32 is activated to ignite the spray of fuel droplets 28. Any type of igniter can be used to ignite the fuel droplets, such as an electrode for example. The operation and structure of the igniter is well known and will not be discussed in further detail.

A second fuel injector 34 is located downstream of the first fuel injector 22. A second fuel line 38 is in fluid communication with the first fuel line 30 at a first connection 40 that is downstream of the first fuel injector 22 and upstream of the check valve 26. The second fuel line 38 extends from the first connection 40 to a second connection 42 at the second fuel injector 34. A controller 44 generates a first control signal to open the first fuel injector 22 to supply fuel to the airless nozzle 16 via the check valve 26 such that fuel droplets 28 can be sprayed. The controller 44 subsequently generates a second control signal to close the first fuel injector 22 and open the second fuel injector 34 to shut off the spray of fuel droplets 28.

The controller 44 can be a separate electronic control unit or microprocessor that is dedicated to the exhaust system 10, or the controller 44 can be integrated into an existing vehicle control unit, such as an engine control unit for example. Further, the controller 44 is programmed with software and is in communication with various vehicle sensors S and vehicle data-links such that controller 44 is provided with sufficient information to determine when the exhaust component 12 is to be regenerated.

For example, pressure sensors can be located upstream and downstream of the exhaust component 12 to monitor a pressure drop across the exhaust component 12. If the upstream and downstream pressures are generally the same then the engine is operating efficiently. However, a large pressure differential between the upstream and downstream pressures can indicate a significant amount of trapped particulate matter which would result in decreased operating efficiency. When this pressure differential reaches a predetermined criteria or limit, the controller can issue a control signal to start a regeneration cycle. It should be understood that this is just one example, and that other methods of determining when regeneration should occur could also be used.

In one example, the controller 44 generates pulse width modulation (PWM) signals to open and close the first 22 and the second 34 fuel injectors such that when the first fuel injector 22 is open, the second fuel injector 34 is always closed, and wherein when the first fuel injector 22 is closed, the second fuel injector 34 is always open (see FIG. 2). Thus, the control signals for the first 22 and second 34 fuel injectors are generally opposite of each other. In one example, units have been tested for 2 to 50 Hz from 10 to 100 percent PWM with good results.

The check valve 26 has a first predetermined set pressure to open and a second predetermined set pressure to close where the first predetermined set pressure is greater than the second predetermined set pressure. In one example, the first predetermined set pressure is greater than 60 psi and the second predetermined pressure is no more than 50 psi. In another example, the first predetermined set pressure is greater than 69 psi and the second predetermined pressure is no more than 45 psi. The check valve's value is set such that a good spray, consisting of small droplets, is generated from the airless nozzle 16. As such, the values can be adjusted as needed to produce a desired droplet size.

When the first fuel injector 22 opens, fuel pressure increases in the first fuel line 30 until the fuel pressure reaches the first predetermined set pressure to open the check valve 26. The volume between the check valve 26 and the first fuel injector 22 is controlled to be a relatively small volume such that rapid pressure rise and rapid spray development is ensured. The fuel droplets are sprayed from the airless nozzle 16 for a predetermined period of time while the first fuel injector 22 is open.

In response to the second control signal closing the first fuel injector 22, the second fuel injector 34 is opened resulting in a decreased pressure between the nozzle 16 and the first fuel injector 22. Due to the small volume between the first fuel injector 22 and the check valve 26, when the first fuel injector 22 is closed and the second fuel injector 34 is opened, pressure rapidly decreases in this area to provide a very fast shut-off without a significant amount of dripping. When the pressure falls to the second predetermined set pressure, the check valve 26 closes to stop the spray of fuel droplets. As such, the first fuel injector 22 comprises a control fuel injector and the second fuel injector 34 comprises a vent/side flow fuel injector.

Once one cycle has been completed, fuel is returned to a fuel supply FS such that the next cycle can begin when needed. The fuel supply FS can be a separate fuel supply or can be the vehicle fuel supply for the engine, for example.

By eliminating the need for a high pressure air system and by simplifying the fuel deliver system, significant cost savings are achieved. Further, this airless system has additional applications in vehicle emissions applications where fine accurate sprays are required. Examples would include: Hydrocarbon Dosing of a Diesel oxidation catalyst and dosing of urea in a SCR system for NOx reduction. Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A fuel delivery system for a vehicle exhaust component comprising:
    a source of pressurized fuel;
        a first fuel injector in fluid communication with said source of pressurized fuel;
        a valve downstream of said first fuel injector;
        an airless nozzle configured to spray fuel droplets when said valve is open;
        a second fuel injector downstream of said first fuel injector; and
        a controller that generates a first control signal to open said first fuel injector to supply fuel to said nozzle via said valve to spray fuel droplets and subsequently generates a second control signal to close said first fuel injector and open said second fuel injector to shut off the spray of fuel droplets.

2. The fuel delivery system according to claim 1 wherein said valve comprises a check valve having a first predetermined set pressure to open and a second predetermined set pressure to close, said first predetermined set pressure being greater than said second predetermined set pressure.

3. The fuel delivery system according to claim 2 where said first predetermined set pressure is greater than 60 psi and said second predetermined pressure is no more than 50 psi.

4. The fuel delivery system according to claim 2 wherein when said first fuel injector opens said second fuel injector is closed, and wherein fuel pressure increases until the fuel pressure reaches said first predetermined set pressure to open said check valve.

5. The fuel delivery system according to claim 4 wherein fuel droplets are sprayed from said airless nozzle for a predetermined period of time while said first fuel injector is open, and in response to said second control signal closing said first fuel injector, said second fuel injector is opened resulting in a decreased pressure between said nozzle and said first fuel injector, and wherein when said pressure falls to said second predetermined set pressure said check valve closes to stop the spray of fuel droplets.

6. The fuel delivery system according to claim 1 including a first fuel line between said first fuel injector and said airless nozzle and wherein fuel is directed into said airless nozzle without any additional external air being introduced into said first fuel line.

7. The fuel delivery system according to claim 6 including a second fuel line in fluid communication with said first fuel line at a first connection that is downstream of said first fuel injector and upstream of said check valve, said second fuel line extending from said first connection to a second connection at said second fuel injector.

8. The fuel delivery system according to claim 1 including a pressure regulator that regulates a pressure of fuel supplied to said first fuel injector.

9. The fuel delivery system according to claim 1 wherein said controller generates pulse width modulation signals to open and close said first and said second fuel injectors such that when said first fuel injector is open, said second fuel injector is always closed, and wherein when said first fuel injector is closed, said second fuel injector is always open.

10. The fuel delivery system according to claim 1 wherein said airless nozzle sprays fuel into a fuel-fired burner to be ignited by an igniter to increase heat to regenerate an exhaust component.

11. A vehicle exhaust system comprising:
- an exhaust component that traps particulate matter; and
- a fuel-fired burner that generates heat such that trapped particulate matter can be burned off in a regeneration cycle for the exhaust component, said fuel-fired burner including an airless fuel deliver system that includes
- a source of pressurized fuel,
- a first fuel injector in fluid communication with said source of pressurized fuel,
- a pressure regulator that regulates a pressure of fuel supplied to said first fuel injector,
- a check valve downstream of said first fuel injector,
- an airless nozzle configured to spray fuel droplets when said check valve is open,
- a first fuel line between said first fuel injector and said airless nozzle wherein fuel is directed into said airless nozzle without any additional external air being introduced into said first fuel line,
- an igniter to ignite said spray of fuel droplets,
- a second fuel injector downstream of said first fuel injector,
- a second fuel line in fluid communication with said first fuel line at a first connection that is downstream of said first fuel injector and upstream of said check valve, said second fuel line extending from said first connection to a second connection at said second fuel injector, and
- a controller that generates a first control signal to open said first fuel injector to supply fuel to said nozzle via said check valve to spray fuel droplets and subsequently generates a second control signal to close said first fuel injector and open said second fuel injector to shut off the spray of fuel droplets.

12. The vehicle exhaust system according to claim 11 wherein said controller generates pulse width modulation signals to open and close said first and said second fuel injectors such that when said first fuel injector is open, said second fuel injector is always closed, and wherein when said first fuel injector is closed, said second fuel injector is always open.

13. The vehicle exhaust system according to claim 12 wherein said check valve has a first predetermined set pressure to open and a second predetermined set pressure to close, said first predetermined set pressure being greater than said second predetermined set pressure, and wherein when said first fuel injector opens fuel pressure increases in said first fuel line until the fuel pressure reaches said first predetermined set pressure to open said check valve, and wherein fuel droplets are sprayed from said airless nozzle for a predetermined period of time while said first fuel injector is open, and in response to said second control signal closing said first fuel injector, said second fuel injector is opened resulting in a decreased pressure between said nozzle and said first fuel injector, and wherein when said pressure falls to said second predetermined set pressure said check valve closes to stop the spray of fuel droplets.

14. A method of delivering fuel to a fuel-fired burner associated with a vehicle exhaust component comprising the steps:
- (a) generating a first control signal to open a first fuel injector to increase fuel pressure to a first predetermined set pressure;
- (b) opening a check valve when said first predetermined set pressure is achieved to deliver fuel to an airless nozzle;
- (c) spraying fuel droplets from the airless nozzle for a period of time that the first fuel injector is open; and
- (d) generating a second control signal to close the first fuel injector and open a second fuel injector to vent fuel such that fuel pressure decreases between the check valve and the first fuel injector to stop the spray of fuel droplets by closing the check valve.

* * * * *